Feb. 18, 1958 R. L. CARMICHAEL 2,824,228

PULSE TRAIN MODIFICATION CIRCUITS

Filed Dec. 30, 1954 5 Sheets-Sheet 1

INVENTOR
R. L. CARMICHAEL
BY H. O. Wright
ATTORNEY

INVENTOR
R. L. CARMICHAEL
BY
H. O. Wright
ATTORNEY

Feb. 18, 1958 R. L. CARMICHAEL 2,824,228

PULSE TRAIN MODIFICATION CIRCUITS

Filed Dec. 30, 1954 5 Sheets-Sheet 3

INVENTOR
R. L. CARMICHAEL
BY
H. O. Wright
ATTORNEY

INVENTOR
R. L. CARMICHAEL
BY H. O. Wright
ATTORNEY

Feb. 18, 1958 R. L. CARMICHAEL 2,824,228

PULSE TRAIN MODIFICATION CIRCUITS

Filed Dec. 30, 1954 5 Sheets-Sheet 5

INVENTOR
R. L. CARMICHAEL
BY H. O. Wright
ATTORNEY

United States Patent Office 2,824,228

Patented Feb. 18, 1958

2,824,228

PULSE TRAIN MODIFICATION CIRCUITS

Robert L. Carmichael, Stanhope, N. J., assignor to Bell Telephone Laboratories, Incorporated, New York, N. Y., a corporation of New York Application December 30, 1954, Serial No. 478,666

11 Claims. (Cl. 250—27)

This invention relates to pulse train modification circuits and to frequency division circuits. More particularly, it relates to such circuits in which delay units are employed with other logic circuit elements to provide simple and economical pulse train modification circuits.

The circuits of this invention represent improved and modified forms of circuits of the general type disclosed and described in H. A. Schneider application Serial No. 456,648, filed September 17, 1954, and assigned to applicant's assignee.

In the design of electronic computers and related apparatus, it is often necessary to synchronize the operations of various components. In serial binary computers, for example, numbers are represented by precisely timed pulse trains, and arithmetic operations are performed synchronously in electronic circuits at a predetermined and accurately controlled rate. A pulse source of a relatively high standard frequency, such as one megacycle per second, for example, is normally employed to synchronize many of the operations of the computer.

In addition to the direct control of operations which recur at the same high frequency of the standard pulse source, the source is also employed to synchronize timed operations which have other timing patterns. For example, the timing patterns may require one output pulse for every sixteen pulses of the standard source, as in frequency division circuits; or they may require successive groups of pulses and spaces. While many circuits have been proposed heretofore for simple frequency division, they are generally not sufficiently flexible to generate successive groups of timed pulses and spaces. In addition, the frequency division circuits of the prior art are often subject to failure, are unduly complex, or are not compatible with the technology of modern computer circuits.

Accordingly, the principal object of the present invention is to simplify and improve pulse train modification circuits which may be used for frequency division.

In accordance with the invention, a standard frequency pulse train is modified by blocking some of the pulses in the pulse train. Circuit units known in the computer art as "AND" units and "Inhibit" units are employed as components of the present circuits. An "AND" unit, by definition, yields an output pulse if input pulses are applied to all input terminals of the unit. An "Inhibit" unit has an inhibiting input terminal and a normal input terminal. Pulses applied to the normal input terminal are blocked when there is also a pulse on the inhibiting terminal, but otherwise pass through the inhibit unit.

In the present circuits, pulses from the continuous pulse train are gated through an inhibit unit when there are no pulses applied to the inhibiting input of the inhibit unit. By connecting the output of the inhibit unit through a delay circuit and then back to the inhibiting terminal of the inhibit unit, alternate groups of pulses of the pulse train are passed and blocked by the inhibit unit. An output AND unit, which is connected to two spaced points in the delay circuit, produces an output pulse when there are pulses present at both of the spaced points in the delay circuit. The AND unit thus selects the desired pulses and blocks an additional group of undesired pulses which have been passed by the inhibit unit.

The pulse modification circuit described in the preceding paragraph may be used in frequency division circuits to provide even-numbered pulse repetition rates. To obtain odd-numbered pulse repetition rates, a feedback delay loop may be added to the circuit in any of several arrangements. In addition, compound pulse train modification circuits employing two or more of the circuits described in the preceding paragraph are particularly useful when it is desired to divide the basic frequency by a large factor. Exact forms of specific illustrative embodiments of these circuits will be described in detail hereinafter.

Other objects and various advantages and features of the invention will become apparent by reference to the following description taken in connection with the accompanying drawings forming a part thereof, and from the appended claims.

Figure 1:
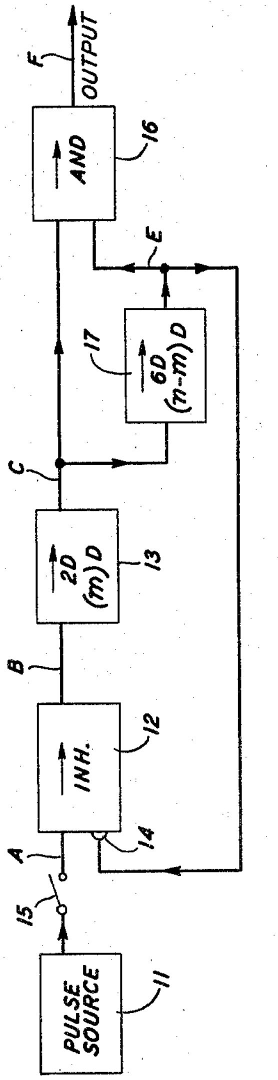
Fig. 1 is a block diagram of one form of pulse train modification circuit in accordance with the invention.
Figure 2:
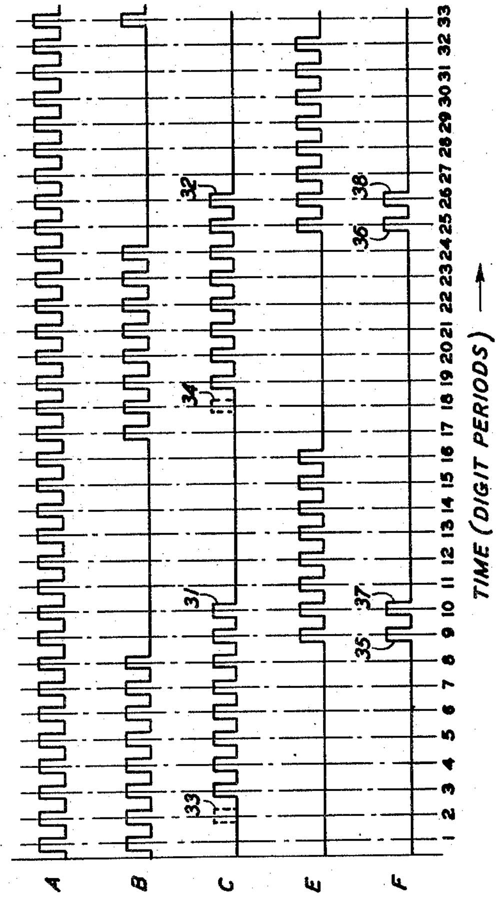
Fig. 2 shows a series of plots of the pulse trains which are present at various points in the circuit of Fig. 1.

Referring more particularly to Figs. 1 and 2 of the drawings, Fig. 1 shows, by way of example and for purposes of illustration, a logic circuit diagram in which the continuous pulse train from a standard pulse source 11 is modified by the elimination of some of the pulses. The pulse source 11 provides regular pulses of short duration at a rate which may, for example, be equal to one pulse per microsecond. In computing apparatus, pulses normally represent binary digits; the interval between successive pulses is therefore termed a digit period. The switch 15 connects the pulse source 11 to the balance of the circuit, and the first pulse after closure of the switch is assumed to occur at a time designated digit period "1" for the purposes of Fig. 2. The pulses from source 11 appear in row A of Fig. 2, and provide a standard of reference for the remaining pulse trains B, C, E and F of Fig. 2. The corresponding points at which these pulse trains appear in Fig. 1 are also designated A, B, C, E and F, respectively.

The pulse output from the source 11 is applied to the inhibit unit 12. The inhibit unit transmits the pulses from the source 11 through to the delay unit 13 when there are no pulses simultaneously present at the inhibit terminal 14 of the inhibit unit 12. The presence of pulses at the inhibit terminal 14, however, blocks the passage of pulses from the pulse source 11.

The delay unit 13 is designated "2D." This indicates that the delay unit 13 includes two digit periods, or two microseconds of delay. Inasmuch as the pulse source 11 has a one microsecond pulse repetition rate, the two microseconds of delay correspond to twice the period at which pulses are produced by the pulse source. Pulses from the delay unit 13 are applied both to one input of the AND unit 16 and to the six digit delay unit 17.

The output of the inhibit unit is shown in pulse train B of Fig. 2. The output from the delay unit 13 is shown by the solid line pulses at row C in Fig. 2 shifted by two digit periods of delay to the right. The dotted pulses 33 and 34 of row C and the reference numerals 31 through 38 are used in the description of the circuit of Fig. 3, and should be ignored for the present. A delay loop is formed by the delay units 13 and 17, together with the inhibit unit 12. Throughout the present description of Fig. 1, it will be assumed that the inhibit unit 12 and the AND unit 16 introduce negligible delay. Accordingly, with the delay unit 13 having two digit periods of delay, and the delay unit 17 having six digits of delay, the total delay around the delay loop is eight digits. Therefore, eight pulses from the source 11 pass through the inhibit unit 12 before a pulse appears at the inhibit terminal 14 of the inhibit unit 12. At that time, however, as indicated by the pulse train at E in Fig. 2, eight successive pulses will appear at the inhibit terminal 14 and will block the next eight pulses from the pulse source 11. This alternate blocking and passing of successive groups of eight pulses from the pulse source 11 is illustrated at row B in Fig. 2.

The AND unit 16 only passes pulses if there are inputs from both delay units 13 and 17. The output from delay unit 13 is shown at C in Fig. 2, and that from delay unit 17 is shown at E in Fig. 2. It may be observed that coincidences occur only at digit times 9 and 10. Accordingly, the output of the AND unit 16 is shown at row F in Fig. 2 as successive groups of two pulses, each appearing at sixteen microsecond intervals.

For purposes of mathematical analysis, the delay unit 13 of Fig. 1 has been designated *m*, and the combined delay of units 13 and 17 is designated *n*. The delay of unit 17 is therefore equal to $(n-m)$. An analysis of the relationships involved in the circuit of Fig. 1 reveals that the number of pulses appearing in time sequence at the output, that is, the number of pulses in each pulse group, is equal to the integral number of microseconds of delay in the portion *m* of the circuit. Similarly, the span of time between the first pulse of one group of pulses and the first pulse of a succeeding group of pulses equals two times the number *n*. Thus, as shown in row F in Fig. 2, the number of pulses in the group of pulses is two, corresponding to the two digits of delay in delay unit 13; and the elapsed time between the beginning of successive groups of two pulses is sixteen microseconds, which is twice the sum of the delay included by the two digit delay unit 13 and the six digit delay unit 17, and is thus equal to the quantity $2n$.

Figure 3:
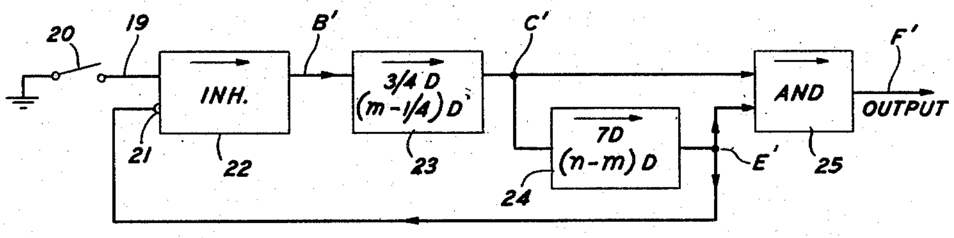
Fig. 3 is a logic circuit diagram of a pulse train modification circuit employed as a frequency division circuit.
Figure 4:
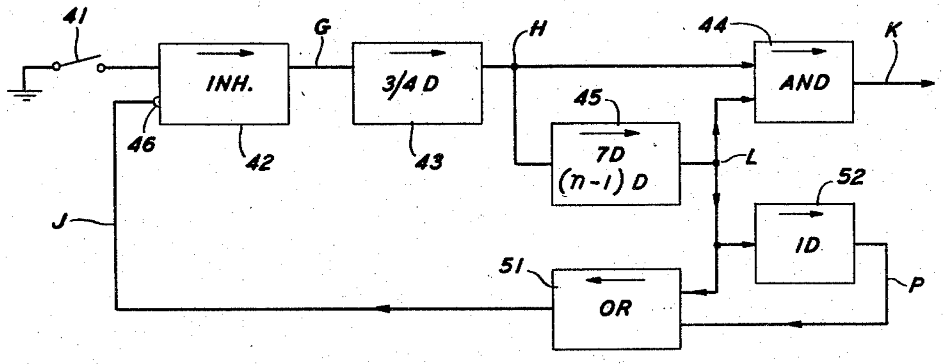
Figs. 4 and 5 represent frequency division circuits in which the fundamental frequency may readily be divided by an odd integer.

The circuit diagram of Fig. 1 was shown in block schematic form, and the inherent delays of logic units 12 and 16 were assumed to be negligible. In Figs. 3 through 5, and 7 through 10, however, the logic circuits are shown in terms of a specific set of "building blocks" or packaged circuits which are employed in a transistor serial binary computer which is employed at the Bell Telephone Laboratories. The circuit diagrams of these packages are disclosed in an article entitled "Regenerative amplifier for digital computer applications," by J. H. Felker, which appeared at pages 1584 through 1596 of the November 1952 issue of the "Proceedings of the I. R. E." (volume 40, No. 11. Four basic logic units which are disclosed on pages 1594 and 1595 of this article, and which are employed in the balance of the circuits of the present specification are as follows:

An OR unit, such as unit 51 in Fig. 4, yields a pulse output if a pulse is present at any of the inputs to the unit;

An AND unit, such as unit 25 in Fig. 3, requires energization of all inputs to yield an output pulse;

An Inhibit unit, such as unit 22 of Fig. 3, is designated "INH" on the drawings. An inhibit unit is generally similar to an AND unit in that all of the normal inputs to the unit must be energized for it to yield an output pulse. However, a pulse on the inhibit input lead (marked with a semicircle at the point where the inhibit lead is connected to the inhibit unit) over-rides all other signals and blocks the output of the unit; and Delay units are indicated by boxes with the letter "D" therein, together with a number indicating the number of digit periods of delay included in the unit.

As disclosed in the article by J. H. Felker cited above, a pulse regenerator is an important part of the AND, INH and delay unit logic circuits. The specific pulse regenerator circuit shown in the Felker article operates satisfactorily and may be used. However, an improved version of pulse regenerator circuit appears in J. H. Felker application Serial No. 376,923, filed August 27, 1953, and, alternatively, this improved circuit may be used.

In the specific illustrative technology referred to hereinabove, pulse signals passing through a regenerator are delayed by one-quarter digit period. In the present circuits, the AND units and the inhibit units all include a pulse regenerator, and thus introduce one-quarter digit period of delay. The OR units in the present logic circuits do not include pulse regenerators and hence, do not introduce any appreciable delay. The delay units which are employed normally include one or more pulse regenerators, and sufficient additional passive delay to equal the delay time indicated in the drawings. Thus, for example, delay unit 24 in Fig. 3 is labelled "7D," indicating that it introduces a total of seven digit periods of delay. Actually, two pulse regenerators, each having one-quarter digit period of delay and passive delay lines having six and one-half units of delay are employed to give the required seven digits of delay.

As mentioned above, inhibit units include a pulse regenerator circuit. The standard frequency source or "clock" signal of the computer, which may, for example, have a pulse repetition rate of one million pulses per second, is connected to each pulse regenerator. This "clock" signal provides a "gating" voltage so that the pulse regenerator produces accurately timed output pulses when the appropriate input signals to the inhibit units are present. The input signal pulses to the inhibit units are positive going pulses which rise from a negative value to about ground potential. Accordingly, when an input terminal of an inhibit unit is grounded, it has the same effect as the application of appropriate control pulses from an external source.

Referring to Fig. 3, the frequency division circuit is started by closing the switch 20 and grounding the input to the normal input lead 19 of the inhibit unit 22. In the absence of pulses at the inhibit terminal 21, the output of the inhibit unit 22 is enabled. A series of output pulses which are timed by the "clock" signal now appear at the output of the inhibit unit.

The circuit of Fig. 3 operates in substantially the same manner as that of Fig. 1. Specifically, the delay units 23 and 24, and the AND unit 25 of Fig. 3 correspond respectively to delay units 13 and 17, and the AND unit 16 respectively, of Fig. 1. In the circuit of Fig. 3, the total delay *n* of the delay loop including units 22, 23 and 24 is, for example, made equal to eight, as in the circuit of Fig. 1. The portion *m* of the delay, which includes the one-quarter digit period delay of the inhibit unit 22 and the three-quarter digit period delay of the unit 23, is equal to one. This is in contrast with the value of two which was selected from the circuit of Fig. 1.

The pulse trains shown in Fig. 2 were discussed above with reference to Fig. 1. With only slight modifications, the pulse trains of Fig. 2 also apply to Fig. 3. Accordingly, the points B′, C′, E′ and F′ of Fig. 3 have been labelled to correspond with the points B, C, E and F referred to in Fig. 2. The series of pulses designated A in Fig. 2 represent the "clock" signal applied internally to the inhibit unit 22 of Fig. 3.

The alternate groups of eight pulses and eight spaces which appear in pulse trains B and E of Fig. 2 are a function of the total delay *n* in the delay loop. Inasmuch as *n* is equal to eight for the illustrative values of delay employed in both Figs. 1 and 3, pulse trains B and E of Fig. 2 apply to both of these circuits. For the purposes of Fig. 3, pulse train B would be shifted by one-quarter digit period to the right as a result of the delay of inhibit unit 22. This is compensated by the delay of unit 23, which is reduced by one-quarter from the nominal value of $m$. The pulse train at point C in Fig. 1 is shown at C in Fig. 2 as retarded by two digit periods, as compared with the pulse train at B. This delay results from the two digit period delay unit 13 of Fig. 1. In Fig. 3, however, the comparable delay $m$ is equal to only one digit period. Therefore, in plot C of Fig. 2, for the purposes of Fig. 3, the pulses 31 and 32 would be eliminated, and pulses 33 and 34 (shown by dotted lines) would be added.

Pulses are required at both points C′ and E′ which, as shown, connect respectively to the two inputs of the AND unit 25 of Fig. 3 to produce an output pulse F′. Referring to Fig. 2, it may be seen that with pulses 31 and 32 eliminated, the required coincidence will only occur at digit periods 9 and 25, as indicated at pulses 35 and 36. Pulses 37 and 38 are thus eliminated. The circuit of Fig. 3 is therefore a frequency division circuit in which the pulse repetition rate is reduced by a factor of 16.

It is clear from the foregoing analysis that whenever $m$ is equal to one, the pulse modification circuits become frequency division circuits. It is again noted that the repetition rate of the frequency division circuit is $2n$ where $n$ is an integer. Because $n$ is an integer, $2n$ must always be an even number, and only even-numbered pulse repetition intervals may be obtained with the circuit of Fig. 3.

Figure 5:
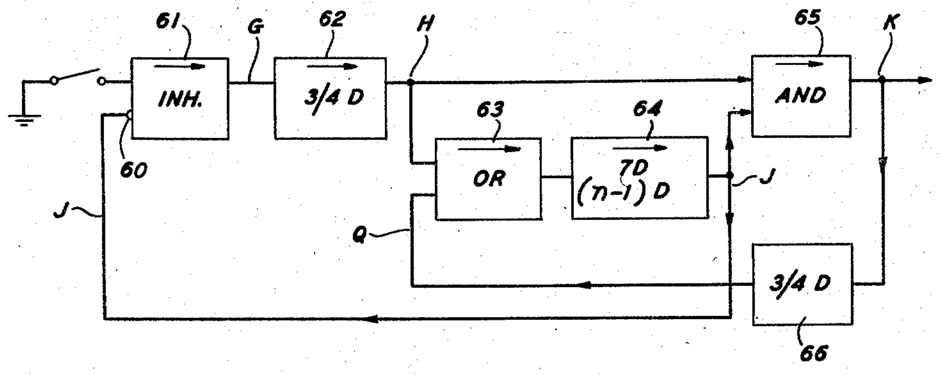

Figs. 4 and 5 illustrate refinements of the frequency division circuit of Fig. 1 in which odd-numbered pulse repetition intervals may also be obtained. In Fig. 4, the frequency division circuit is set into operation by closure of the switch 41. When the switch 41 is closed, pulses appear at the output of the inhibit unit 42. It is assumed that the first clock pulse is applied to the inhibit unit 42 at a time designated digit period "1"; accordingly, the first pulse at point G at the output of inhibit unit 42 appears at digit period 1 and ¼. After passing through the three-quarter digit delay unit 43, the pulses are applied to both the AND unit 44 and the seven digit delay unit 45.

Figure 6:
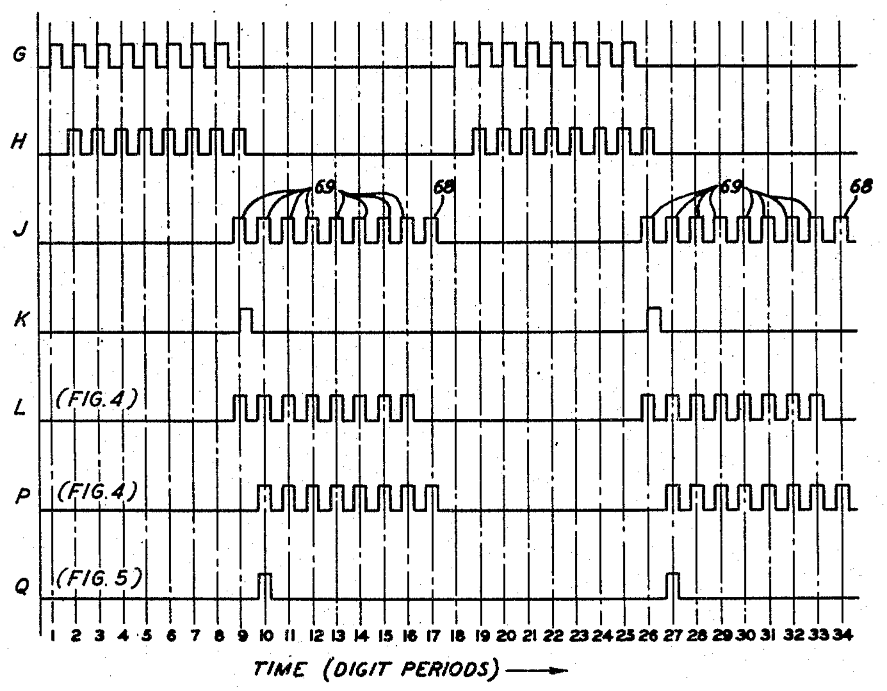
Fig. 6 shows diagrammatically the pulse trains which are present at various points in the circuits of Figs. 4 and 5.

The pulse trains relating to the circuit of Fig. 4 are shown in Fig. 6. For example, groups of eight pulses followed by nine spaces appear at point G at the output of the inhibit unit 42. Thus, there are pulses present at the output of inhibit unit 42 during digit periods 1 through 8 following the closure of switch 41, and a second group of eight pulses are present in digit periods 18 through 25. In row H of Fig. 6, the groups of pulses shown in row G are illustrated as delayed by three-quarters of a digit period. The group of pulses at H enable one of the input leads to the AND unit 44. The group of pulses from point H are also applied to the seven digit delay unit 45, and appear at point L delayed by the seven digit periods. Accordingly, both inputs of the AND unit 44 are enabled only during digit period 9. The pulses in row K, accordingly, appear at digit periods 9 and 26. The main delay loop from the output of the inhibit unit 42 back to the inhibit terminal 46 of the inhibit unit includes the delay units 43 and 45, and the OR unit 51. With the inhibit unit having one-quarter digit period delay, and the OR unit 51 introducing no appreciable delay, the loop delay is eight digit periods. In the absence of the subsidiary delay unit 52, therefore, it would be expected that the pulse repetition interval of the frequency division circuit of Fig. 4 would be equal to $2n$. With $n$ equal to eight, the pulse repetition interval would be sixteen digit periods. The changes caused by the additional delay unit 52 are best illustrated by rows L and P of Fig. 6. In row L, the eight pulses passed by the delay unit 45 are shown displaced by seven digits from their time position at point H. The pulse train in row P indicates a further displacement of the group of eight pulses caused by the one digit period delay unit 52. The output pulses from points L and P are both applied to OR unit 51, and from the output of the OR unit to the inhibit terminal 46 of the inhibit unit 42. The pulse train applied to the inhibit terminal 46 is shown at J as including nine pulses. This group of nine pulses prevents pulses from appearing at the output of inhibit unit 42 for nine digit periods numbered 9 through 17, inclusive. Accordingly, the pulse repetition interval of the frequency division circuit is shifted from sixteen digit periods to seventeen digit periods by the addition of delay unit 52. This corresponds to the seventeen digit period spacing of the pulses shown in row K at digit intervals 9 and 26.

The circuit of Fig. 5 achieves the same result as that of Fig. 4, but in a slightly different manner. In Fig. 5, the delay loop connecting the output of the inhibit unit 61 to the inhibit terminal 60 includes the three-quarter digit delay unit 62, the OR unit 63, and the seven digit delay unit 64. The output AND unit 65 has two inputs connected to spaced points in the delay loop noted above. The output pulses at point K are connected through the three-quarter digit delay unit 66 back to a second input of the OR unit 63. The pulses at points G, H, J and K of Fig. 5 are identical with those of Fig. 4, and are shown by the same sets of pulses in Fig. 6. The additional delay unit 66 of Fig. 5 performs substantially the same function as the additional delay unit 52 of Fig. 4. An output pulse at K appears at the coincidence of pulse trains H and J during digit period 9. To be entirely accurate, however, the output pulse K occurs at digit period 9 and ¼, the additional one-quarter digit period being introduced by the regenerator in the AND unit 65. The output pulse at K is passed through the three-quarter digit delay unit 66 and applied to OR unit 63 together with the pulse train from H. However, by comparing rows H and Q of Fig. 6, it may be observed that the pulses in row Q appear at digit times 10 and 27, which are one digit period later than the latest pulse in each group of pulses in row H. In row J, there are nine pulses in each group of pulses. The last pulse 68 in each group of pulses in row J is derived from the individual pulses in row Q. The rest of the pulses designated 69 in row J are derived from the pulses at point H. Accordingly, by the use of the feedback delay circuit including unit 66, the pulse repetition interval of the frequency division circuit of Fig. 5 has been increased from sixteen digit periods to seventeen digit periods.

In the circuits of Figs. 3 and 5, the pulse repetition rates were reduced by factors of sixteen and seventeen, respectively. When it is desired to increase this frequency division factor, increased amounts of delay may be introduced by delay units corresponding to units 23 and 24 of Fig. 3. However, a more economical method of increasing the frequency division factor is provided by the use of compound frequency division circuits. The following circuits of Figs. 7 through 10 illustrate various combinations of the basic frequency division circuits of Figs. 3, 4, and 5.

Figure 7:
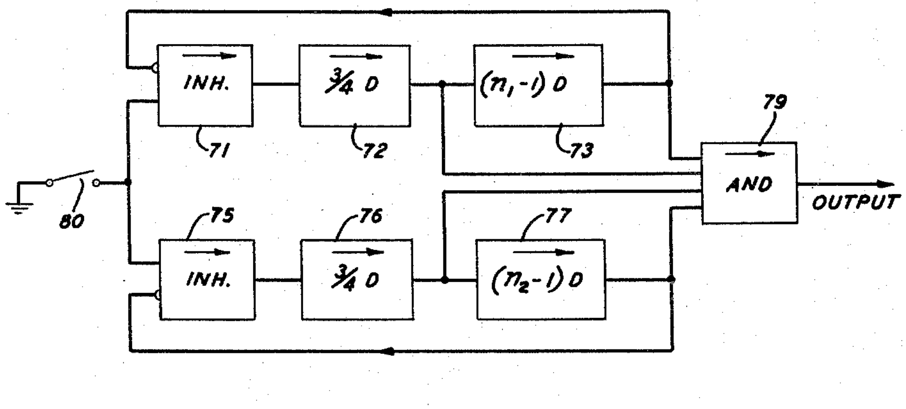
Figs. 7 through 10 show logic circuit diagrams of compound frequency division circuits which are built up from the circuits of Figs. 3, 4, or 5.

In Fig. 7, two simple frequency division circuits of the type shown in Fig. 3 are joined together. The upper circuit includes the inhibit unit 71, the three-quarter digit delay unit 72, and another delay unit 73. The lower frequency division circuit has a delay loop including the inhibit unit 75, the three-quarter digit delay unit 76, and the additional delay unit 77. Outputs from two different points in each of the networks are connected to the AND unit 79. Switch 80 starts the operation of the compound frequency division circuit, by grounding the normal inputs of both inhibit unit 71 and inhibit unit 75 simultaneously. Analysis of the circuit of Fig. 7 reveals that the repetition interval of the compound circuit is the least common denominator of the quantity $$\left(\frac{1}{2n_1}+\frac{1}{2n_2}\right)$$

where $n_1$ and $n_2$ are the total delays in the delay loops of the upper and lower component frequency division circuits, respectively.

Figure 8:
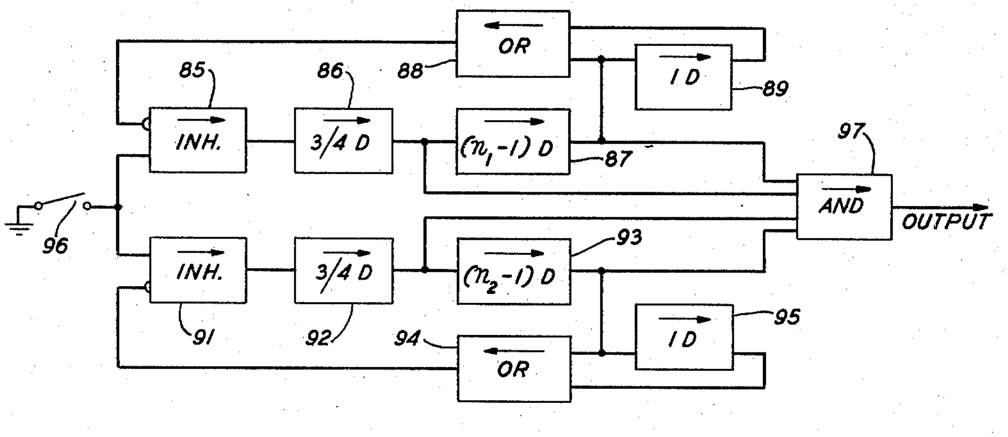

Fig. 8 shows another compound frequency division circuit. In this compound circuit, two circuits of the type shown in Fig. 4 are employed. In the upper portion of the circuit, the main delay loop includes the inhibit unit 85, the three-quarter digit delay unit 86, another delay unit 87 having $(n_1-1)$ digits of delay, and the OR unit 88. A subsidiary one digit delay unit 89 is provided to obtain an odd-numbered repetition interval for the upper circuit as described in detail in connection with Fig. 4. Similarly, the lower portion of the compound circuit includes a principal delay loop including the inhibit unit 91, delay units 92 and 93, and the OR unit 94. The subsidiary one digit delay unit 95 is also provided in the lower portion of the compound circuit. Closure of the switch 96 initiates the operation of the compound frequency division circuit. The AND unit 97 is again coupled to two spaced points in each of the delay loops of the upper and lower circuits, respectively, as shown. The pulse repetition interval at the output of the compound circuit is equal to the least common denominator of $$\left(\frac{1}{2n_1+1}+\frac{1}{2n_2+1}\right)$$

where $n_1$ and $n_2$ are the delays in the main delay loops in the upper and lower circuits, respectively.

Figure 9:
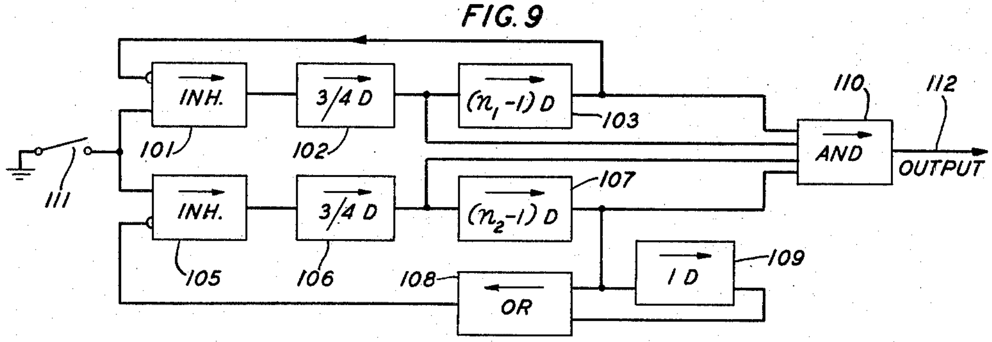

The compound frequency division circuit of Fig. 9 is a combination of the basic circuits of Figs. 3 and 4. The upper circuit corresponds to the simple circuit of Fig. 3, and has a delay loop including inhibit unit 101, delay unit 102, and a second delay unit 103. The lower portion of the compound circuit has a main delay loop which includes the inhibit unit 105, the three-quarter digit delay unit 106, delay unit 107, and the OR unit 108. A third delay unit 109 in the lower circuit is coupled from the output of delay unit 107 to another input of the OR unit 108. The AND unit 110 has four input circuits, two of which are coupled to spaced points in the delay loop of the upper circuit, and the other two leads are connected to spaced points in the delay loop of the lower circuit, as shown. The switch 111 initiates operation of the compound count-down circuit of Fig. 9. The pulse repetition interval at output lead 112 of the AND unit 110 is the least common denominator of the quantity $$\left(\frac{1}{2n_1}+\frac{1}{2n_2+1}\right)$$

where $n_1$ and $n_2$ are the total delays in the main delay loops of the upper and lower component circuits, respectively.

Figure 10:
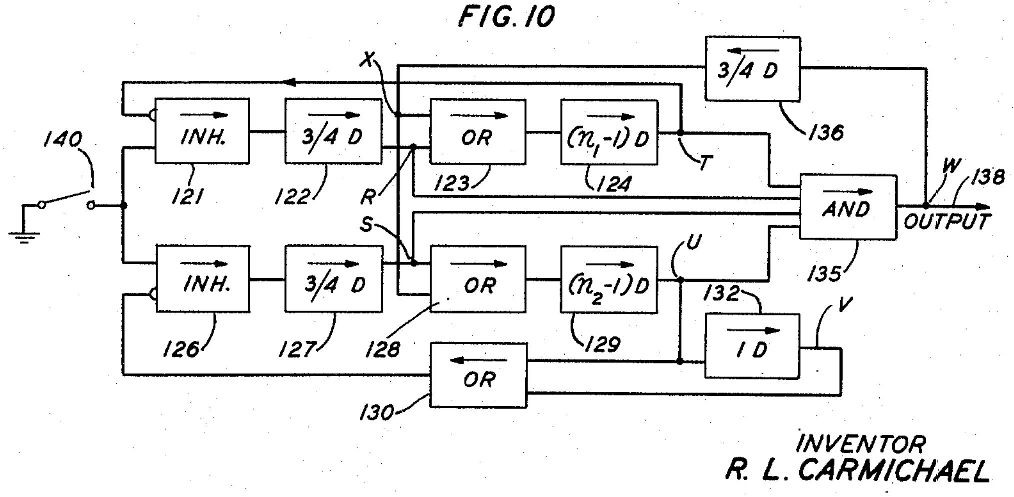

The compound frequency division circuit of Fig. 10 employs an upper circuit which is patterned after the frequency division circuit of Fig. 5, and a lower frequency division circuit which includes features derived from the circuits of Figs. 4 and 5. The main delay loop of the upper circuit includes the inhibit unit 121, the delay unit 122, the OR unit 123, and a second delay unit 124. The main delay loop of the lower circuit includes the inhibit unit 126, the delay unit 127, the OR unit 128, a second delay unit 129, and a second OR unit 130. The lower frequency division circuit also includes a one digit period delay unit 132 which is connected between the output of the delay unit 129 and a second input to the OR unit 130. The AND unit 135 has four input circuits, of which two are coupled to each of the subsidiary frequency division circuits in substantially the same manner as described above for the other compound frequency division circuits. The three-quarter digit delay unit 136 is connected between the output 138 of the AND unit 135 and the OR unit 123. The delay unit 136 is also employed in a feedback loop to the OR unit 128 of the lower frequency division circuit. The switch 140 starts the operation of the compound frequency division circuit by grounding a normal input of both of the inhibit units 121 and 126.

The pulse repetition interval of the frequency division circuit of Fig. 10 is equal to 1 plus the least common denominator of the quantity $$\left(\frac{1}{2n_1}+\frac{1}{2n_2+1}\right)$$

Figure 11:
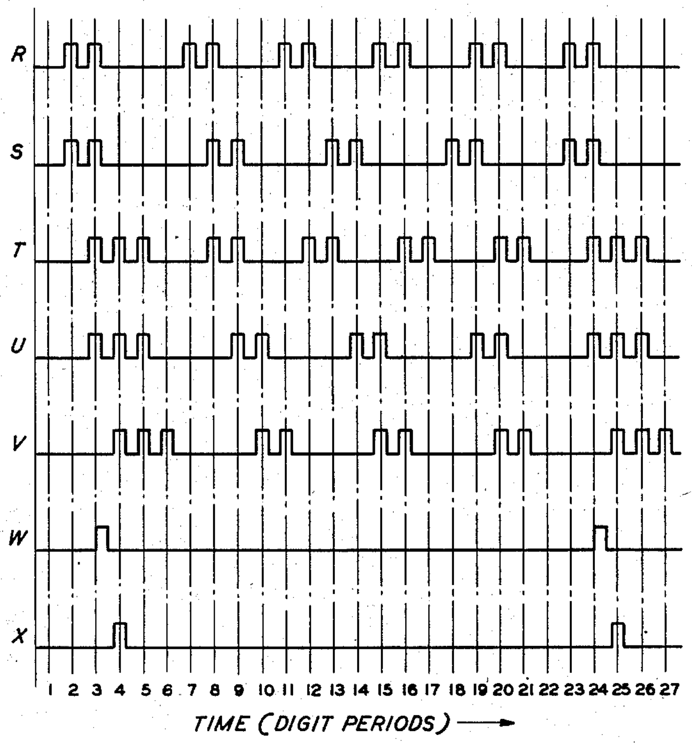
Fig. 11 shows a series of plots of the pulse trains which are present at various points in the circuit of Fig. 10.

To verify the foregoing expression, pulse trains at various points in the circuit of Fig. 10 are shown in Fig. 11. For the purposes of Fig. 11, it is assumed that the first pulses appear at the outputs of inihbit units 121 and 126 at times corresponding to digit period 1 and ¼. In addition, it is assumed that $n_1$ is equal to 2D, and that $n_2$ is also equal to 2D. Accordingly, the repetition interval should be equal to [LCD of (¼+⅕)]+1. This quantity is equal to twenty-one digit periods. This indicates that an output pulse should appear at output lead 138 from AND unit 135 once every twenty-one digit periods. The pulses present at the points R, T and X in the upper count-down circuit can readily be determined in the same manner disclosed in Fig. 6 for the count-down circuit of Fig. 5. Similarly, the pulse trains U, V and X for the lower frequency division circuit can readily be determined as shown in Fig. 6 for the circuits of Figs. 4 and 5. The AND unit 135 will transmit a pulse to the output lead 138 only when there are pulses present on all four input leads to the AND unit. Therefore, pulses must be present at points R, S, T and U in order for a pulse to be produced at point W at output lead 138. Examination of rows R, S, T and U in Figure 11 indicate that there are pulses present at all four points only at digit periods three and twenty-four. Accordingly, output pulses appear at point W at times corresponding to three and one-quarter digit periods and twenty-four and one-quarter digit periods. The extra one-quarter digit periods result from the time delay introduced by the AND unit 135. The difference between three and one-quarter and twenty-four and one-quarter is twenty-one digit periods. This corresponds to the pulse repetition interval of twenty-one which is given by the formula set forth above.

The foregoing circuits have been described in detail with reference to a particular technology to provide a full disclosure of operative circuits illustrating the principles of the invention. Other sets of logic circuit elements are known and may readily be used in the present circuits instead of those disclosed in the article and patent application of J. H. Kelker cited above. With reference to Fig. 1, for example, the inhibit unit 12 may include a pulse regenerator synchronized with the pulse source 11. When inhibit logic circuits which do not include a clock controlled pulse regenerator are used, however, as in the realization of the circuits of Figs. 3 through 5 and 7 through 10, a pulse source must be connected to a normal input of the inhibit units, as shown in Fig. 1. The OR unit used in these circuits was disclosed as having negligible delay. OR units having delay may, of course, be employed, the additional delay of the OR unit being deducted from that of an adjacent delay unit in the same delay loop.

In Figs. 7 through 10, three illustrative compound frequency division circuits are shown. Each of these compound circuits is made up of two of the basic frequency division circuits shown in Figs. 3, 4 and 5. However, it is apparent that three or more of the basic circuits may be employed in a compound frequency division circuit, and that other combinations of the three basic circuits may be used. In addition, compound pulse train modificcation circuits, in which groups of pulses appear at the output, may be formed using basic circuits such as that shown in Fig. 1.

It is to be understood that the above-described arrangements are illustrative of the application of the principles of the invention. Obviously, numerous other arrangements may be readily devised by those skilled in the art without departing from the spirit and scope of the invention.

What is claimed is:

1. In combination, an inhibit unit having normal and inhibit input terminals, and an output terminal; an AND unit having two input terminals and one output terminal, a source of pulses coupled to said inhibit unit, first and second means for delaying electrical pulses connected in series with the output and the inhibit input terminals of said inhibit unit, circuit means for coupling all of the output pulses from said first delay means to one of the input terminals of said AND unit, and additional circuit means for coupling all of the output pulses from said second delay means to the other input terminal of said AND unit.

2. In combination, a source of pulses having a predetermined period between successive pulses, an inhibit unit connected to said pulse source, an AND unit, a delay unit, first and second circuit means connected from the output of said inhibit unit for supplying the output pulse trains from said inhibit unit to separate inputs of said AND unit, the first of said circuit means including said delay unit and the second of said circuit means by-passing said delay unit; means providing delay equal to at least two of said predetermined periods in the path connecting said pulse source, inhibit unit, first circuit, and said AND unit; and a circuit connecting the output of said delay unit to the inhibit terminal of said inhibit unit.

3. In combination, an inhibit unit, a source of pulses coupled to said inhibit unit, an inhibiting input terminal for blocking said pulses, a delay circuit connected from the output of said inhibit unit to said inhibiting input terminal, an output AND unit, and means for connecting the inputs of said AND unit to receive all of the pulses from two spaced points in said delay circuit.

4. In combination, an inhibit unit having an output terminal and an inhibiting input terminal, an AND unit, an OR unit, and first, second and third delay units, circuit means connecting said inhibit unit, said first and second delay units and said OR unit in a series circuital loop from the output terminal of said inhibit unit to the inhibiting input of said inhibit unit, circuit means connecting said third delay unit from the output of said second delay unit to an input of said OR unit, and circuit means connecting two input terminals of said AND unit to the output of said first and second delay units, respectively.

5. In combination, an inhibit unit, an AND unit, an OR unit, first, second and third delay units, circuit means for connecting said first delay unit, said OR unit and said second delay unit in series circuit between the output of said inhibit unit and the inhibiting input terminal of said inhibit unit, circuit means connecting two inputs of said AND unit to the respective outputs of said first and second delay units, and means connecting said third delay unit from the output of said AND unit to an input of said OR unit.

6. In a compound frequency division circuit, two subsidiary circuits each including an inhibit unit and first and second delay units, said first and second delay units being connected in series between the output terminal of said inhibit unit and the inhibiting input terminal of said inhibit unit; an AND unit having four input terminals, circuit means for coupling a first pair of said input terminals to the output of first and second delay units in one of said subsidiary circuits, and circuit means for coupling the other pair of said input circuits to the output of first and second delay units in the other of said subsidiary circuits.

7. In combination, an inhibit unit having an inhibiting input terminal, a source of recurring electrical signals coupled to said inhibit unit, control means for enabling said inhibit unit to produce output pulses corresponding to said recurring signals in the absence of pulses applied to said inhibiting input terminal, a circuit delay loop connected between the output and the inhibiting input terminals of said inhibit unit, an AND unit, and circuit means independent of said enabling means for applying control pulses to all of the input leads of said AND unit, said circuit means including a circuit for connecting all of the pulses from one point in said delay loop to one input of said AND unit and another circuit for connecting all of the pulses from another point in said delay loop to another input of said AND unit.

8. In combination, an inhibit unit having an inhibiting input terminal, a source of clock signals coupled to said inhibit unit, control means for enabling said inhibit unit to produce output clock pulses in the absence of pulses applied to said inhibiting input terminal, a circuit delay loop connected between the output and the inhibiting input of said inhibit unit, an AND unit, and circuit means independent of said enabling means for applying control pulses to all of the input leads of said AND unit, said circuit means including a circuit for connecting all of the pulses from one point in said delay loop to one input of said AND unit and another circuit for connecting all of the output pulses from another point in said delay loop to another input of said AND unit.

9. In combination, an inhibit unit having an inhibiting input terminal, a source of clock signals coupled to said inhibit unit, control means for enabling said inhibit unit to produce output clock pulses in successive digit period intervals in the absence of pulses applied to said inhibiting input terminal, a circuit delay loop including at least two digit periods of delay connected between the output and the inhibiting input of said inhibit unit, an AND unit, and circuit means independent of said enabling means for applying control pulses to all of the input leads of said AND unit, said circuit means including a circuit for connecting all of the pulses from one point in said delay loop to a first input of said AND unit and another circuit for connecting all of the output pulses from another point in said delay loop to a second input of said AND unit, the delay included between the output terminal of said inhibit unit and said first input of said AND unit differing from the delay included between the output of said inhibit unit and the said second input of said AND unit by an integral number of digit periods.

10. A frequency division circuit comprising an inhibit unit, a circuit loop including a substantial amount of delay connected between the output of said inhibit unit and the inhibiting input terminal of said inhibit unit, an AND unit having at least two input circuits, circuit means for applying all of the pulses appearing at one point in said circuit loop to one of said two input circuits, circuit means for applying all of the pulses appearing at another point in said delay loop to another input of said AND unit, and additional circuit means including an additional delay unit coupling pulse signals derived from said circuit loop back to a point in said circuit loop.

11. In a compound frequency division circuit, two subsidiary circuits, each including an inhibit unit and first and second delay units, said first and second delay units being connected in a series circuital loop between the output and the inhibiting input terminal of said inhibit unit, another delay unit being connected in one of said subsidiary circuits from the output of one delay unit to another point in the circuital loop, an AND unit having at least four input terminals, circuit means for coupling a first pair of said input terminals to receive all of the pulses from the respective outputs of two of said delay units in one of said subsidiary circuits, circuit means for coupling the other pair of said input circuits to receive all of the pulses from the outputs of the first and second delay units in the other of said subsidiary circuits, and an additional delay unit being connected between the output of said AND unit and at least one of said series circuital loops.

References Cited in the file of this patent

Proc. of the I. R. E., January 1952, "Logical Description of Some Digital-Computer Adders and Counters," by Gray.